(12) United States Patent
Jacobson et al.

(10) Patent No.: US 8,751,664 B2
(45) Date of Patent: Jun. 10, 2014

(54) CUSTODIAN-BASED ROUTING IN CONTENT-CENTRIC NETWORKS

(75) Inventors: Van L. Jacobson, Woodside, CA (US); Marc E. Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 279 days.

(21) Appl. No.: 12/970,740

(22) Filed: Dec. 16, 2010

(65) Prior Publication Data

US 2012/0158973 A1    Jun. 21, 2012

(51) Int. Cl.
*G06F 15/16*    (2006.01)

(52) U.S. Cl.
USPC .......................................... 709/227; 709/219

(58) Field of Classification Search
USPC .......................................................... 709/227
See application file for complete search history.

(56) References Cited

U.S. PATENT DOCUMENTS

| | | | | |
|---|---|---|---|---|
| 7,580,971 | B1 * | 8/2009 | Gollapudi et al. | 709/203 |
| 2002/0078066 | A1 * | 6/2002 | Robinson et al. | 707/104.1 |
| 2003/0074472 | A1 * | 4/2003 | Lucco et al. | 709/245 |
| 2005/0149508 | A1 * | 7/2005 | Deshpande | 707/3 |
| 2007/0204011 | A1 * | 8/2007 | Shaver et al. | 709/219 |
| 2009/0144300 | A1 * | 6/2009 | Chatley et al. | 707/100 |
| 2009/0287835 | A1 * | 11/2009 | Jacobson | 709/229 |
| 2010/0088370 | A1 * | 4/2010 | Wu et al. | 709/203 |
| 2011/0286459 | A1 * | 11/2011 | Rembarz et al. | 370/392 |

FOREIGN PATENT DOCUMENTS

EP    2214357 A1    4/2010

OTHER PUBLICATIONS

Jacobson, Van et al. "VoCCN: Voice Over Content-Centric Networks." Dec. 1, 2009. ACM ReArch'09.*
Jacobson, Van et al., "VoCCN: Voice-over Content-Centric Networks", Dec. 2009, pp. 1-6, Retrieved from the internet: URL:http://conferences.sigcomm.org/co-next/2009/workshops/rearch/papers/jacobson.pdf (Retrieved on Mar. 7, 2012).
Jacobson, Van et al., "Networking Named Context", Dec. 2009, pp. 1-13, Retrieved from the internet: URL:http://conferences.sigcomm.org/co-next/2009/papers/jacobson.pdf (Retrieved on Mar. 6, 2012).

* cited by examiner

*Primary Examiner* — Liangche A Wang
*Assistant Examiner* — Johnny Aguiar
(74) *Attorney, Agent, or Firm* — Shun Yao; Park, Vaughan, Fleming & Dowler LLP

(57) ABSTRACT

One embodiment of the present invention provides a system for facilitating custodian-based routing. During operation, the system receives, at a computing device, a request for a piece of content from a user, and determines whether the content is available locally. In response to the content not being available locally, the system identifies a remote custodian device that stores the content. The custodian device is not identified by its physical address. The system then identifies a communication endpoint associated with the identified custodian device, and maps a physical address corresponding to the identified communication endpoint. The system establishes a connection to the communication endpoint using the mapped physical address to obtain the requested content.

23 Claims, 6 Drawing Sheets

CUSTODIAN-BASED ROUTING IN CONTENT-CENTRIC NETWORKS

RELATED APPLICATION

The subject matter of this application is related to the subject matter of the following applications:

U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;

U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;

U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

the disclosures of which are incorporated by reference in their entirety herein.

FIELD

The present disclosure relates generally to routing in content-centric networks. More specifically, the present disclosure relates to an apparatus and a method for facilitating custodian-based routing in a content-centric network.

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than the ARPAnet was designed to provide. Ideally, an Internet user should have access to any content, anywhere, at any time—a task that is difficult to perform with the current location/device-binding TCP/IP (transmission control protocol/Internet protocol) networks.

Content-centric networks (CCN), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system for facilitating custodian-based routing. During operation, the system receives, at a computing device, a request for a piece of content from a user, and determines whether the content is available locally. In response to the content not being available locally, the system identifies a remote custodian device that stores the content. The custodian device is not identified by its physical address. The system then identifies a communication endpoint associated with the identified custodian device, and maps a physical address corresponding to the identified communication endpoint. The system establishes a connection to the communication endpoint using the mapped physical address to obtain the requested content.

In one variation on this embodiment, the computing device and the custodian device are coupled via a content-centric network (CCN).

In a further variation on this embodiment, identifying the custodian device that stores the content involves performing a lookup based on the content's name.

In a further variation, the system further constructs an interest for mapping information associated with the content's name.

In one variation on this embodiment, identifying the custodian device that stores the content involves determining a preference level of the custodian device.

In one variation on this embodiment, identifying the communication endpoint involves performing a lookup based on the custodian device's name.

In one variation on this embodiment, identifying the communication endpoint involves determining a preference level of the communication endpoint.

In one variation on this embodiment, the communication endpoint is a wireless interface, and the physical address includes at least one of: a service set identifier (SSID), a media access control (MAC) address of an access point associated with the wireless interface, and an Internet Protocol (IP) address.

In one variation on this embodiment, the connection to the communication endpoint includes a session initiation protocol (SIP) connection.

BRIEF DESCRIPTION OF THE FIGURES

In the figures, like reference numerals refer to the same figure elements.

DETAILED DESCRIPTION

Figure 1:
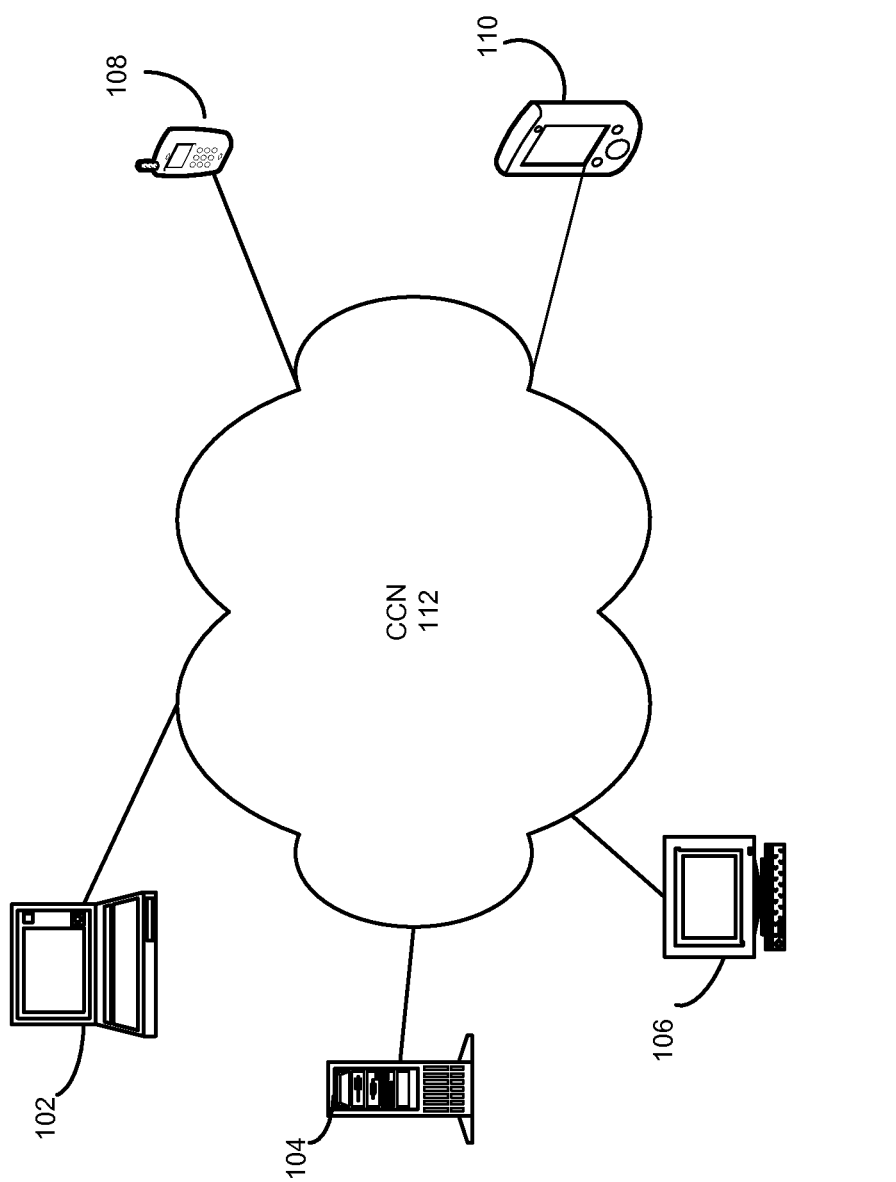
FIG. 1 presents a diagram illustrating the exemplary architecture of a CCN-based content delivery network (CDN) in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method and a system that facilitate content distribution within a social network group based on custodian routing. In embodiments of the present invention, content is associated with a custodian, which is a device that stores the content. During operation, a client device requests a piece of content by sending an interest for the content. To route the content interest to the custodian of the content, the routing mechanism performs a lookup based on the prefix of the content name to determine the corresponding custodian, and identifies a communication endpoint for that custodian. Subsequently, the client device can establish a communication channel, such as a point-to-point tunnel negotiated by session initiation protocol (SIP), with the communication endpoint in order to obtain the requested content. Each device in the CCN exchanges its prefix-to-custodian and custodian-to-endpoint mapping with its neighboring devices, thus resulting in such routing information being propagated throughout the network. Because content is now associated with a custodian, instead of trying to locate each piece of content, the system now only needs to keep track of the location of the custodian, which is changed less frequently and results in relatively compact routing information updates.

If devices do not have existing mappings, but wish to communicate, the system setup can provide a bootstrapping process. In one embodiment, a network operator or an ISP may provide an external registration agent, like a default route, that can be contacted if no prefix-to-custodian mapping is found, and allow its subscribers to register their mappings with it. In a further embodiment, the application software that uses the system can provide a bootstrapping step. For example, when a user wishes to trust another user, a non-CCN message, such as a short message service (SMS) message or an email, can be used to authenticate the users to each other and to exchange essential connection information, thus allowing a full exchange of prefix-to-custodian and custodian-to-endpoint mappings.

Although the present disclosure is presented using examples based on the CCN, embodiments of the present invention are not limited to the CCN.

The term "custodian" refers to a device that stores the content of interest. A custodian can be any type of device that is capable of storing data in volatile or non-volatile storage. A custodian can be a mobile computing device, such as a laptop computer, a tablet or slate computer, a smart phone, or a personal digital assistant (PDA); or a stationary computing device, such as a desktop computer or a home media server.

The term "communication endpoint" refers to a communication interface located on a computing device, through which a remote device can communicate with the computing device. A "communication endpoint" can be any type of communication interface, including, but not limited to: a WiFi™ (trademark of the Wi-Fi Alliance) interface, a 3G cellular interface, and a Bluetooth™ (trademark of the Bluetooth Special Interest Group of Kirkland, Wash.) interface.

Content-Centric Network

CCN names can include an explicitly specified number of components. In addition, CCN names are persistent and content-specific. That is, if a user changes the content of a file or data object, the modified content is effectively associated with a new name. This persistency can be achieved with an explicit versioning mechanism, where, for example, the new content can be "version 4" of a given name. The version is often a timestamp. The persistency can also be achieved implicitly. For example, contents can be associated with not only their human-established names, but also with authentication metadata (e.g., a digital signature by the publisher of the content). As a result, the complete content name changes when the data associated with a given name changes.

In a content-centric network (CCN), communication is driven by the consumers of data. In a CCN, there are two packet types, interest and data. An interest packet (also called a query) is a request for some content. An interest packet encodes a special form of query that expresses what content is desired and what content is not desired. A data packet (also called a content packet) is a unit of content. Data packets are self-identifying by carrying within them their full name. A consumer can ask for content by broadcasting its interest over all available connectivity. Any node hearing the interest and having data that satisfies it can respond with a data packet. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet. An interest may specify the exact version to retrieve or may specify any version greater than a specified version, known as a "get-the-latest-version interest."

Functionally, a CCN can retain associations between various names and the content which they represent. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCNs allow the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Content Sharing Among a Social Network Group

Sometimes people within a social network group, such as family members or a group of friends, may wish to share content stored in their personal computing devices with each other. For example, a user may want to obtain photos stored in his wife's mobile phone regardless of his current location. Such a demand is challenging for a conventional IP-based network because the device storing the content is mobile, thus making tracking and obtaining the content difficult. Each time the device moves, the system needs to associate each piece of content stored on the device with its new location.

To address this content-sharing problem, embodiments of the present invention establish a content delivery network (CDN) based on a CCN. Such CCN-based CDN is achieved by sparsely overlaying a CCN over an IP network (or any other conventional network). FIG. 1 presents a diagram illustrating the exemplary architecture of a CCN-based CDN in accordance with an embodiment of the present invention. CDN 100 includes a number of devices, such as a laptop computer 102, a media server 104, a desktop computer 106, a smart phone 108, and a PDA 110, coupled to each other via a CCN 112. Note that CCN 112 overlays a conventional IP network (not shown in FIG. 1), and the fact that devices 102-110 couple to each other via CCN 112 does not require any change to the existing Internet infrastructures.

Devices 102-110 belong to different members within a social network group, such as a family, which can be based on an inherent social structure. A predefined social network group can provide a content distribution boundary, thus allowing the CCN-based CDN to be automatically configured. For example, each time a family member purchases a new computing device, it is included in the CDN, and routings within the CDN are updated as a result of the addition. A device in CDN 100 can be a custodian of certain content. For example, media server 104 can be the custodian for all multimedia content, such as photos and audio/video files. In general, different custodians can be used for different CCN name spaces, i.e., different custodians can store content with different CCN name prefixes. For example, smart phone 108 belonging to family member Bob can be a custodian for CCN name space: Bob home/photos, and media server 104 can be a custodian for CCN name space: /Bob home/videos. In addition, a particular piece of content can have more than one custodian. For example, photos taken by smart phone 108 and copied to media server 104 can have both media server 104 and smart phone 108 as custodians.

Through CCN 112, devices 102-110 can share their stored content with each other regardless of the physical locations of the devices. For example, a family member using smart phone 108 may travel away from his home and want to obtain a photo from his home media server 104, which may have a dynamically changing IP address. To do so, smart phone 108 expresses an interest to the photo based on its CCN name, and this interest is routed to media server 104 by CCN 112. Subsequently, smart phone 108 can establish a communication channel with media server 104 via an available communication endpoint located on media server 104. Through the established communication channel, smart phone 108 can obtain the photo from media server 104.

Because media server 104 has a dynamically changing IP address, content stored in it cannot be easily associated with any static address. Instead, the content is associated with media server 104, the custodian. When the IP address of the custodian changes, or when the custodian moves, instead of knowing where each piece of content has moved, a content requester only needs to find out where the custodian has moved, and the routing mechanism of CCN 112 can route the interest for the content to the media server 104. To route a content interest properly to the custodian of the content, three types of binding are needed: the content-prefix-to-custodian binding, the custodian-to-communication-endpoint binding, and the communication-endpoint-to-physical-address binding.

The content-prefix-to-custodian binding binds the CCN name prefix of a piece of content to its custodian, thus allowing a remotely coupled device to identify the custodian of such content by performing the longest prefix matching. Note that, in embodiments of the present invention, identifying the custodian is based on the content prefix mapping, and does not rely on knowing the physical address of the custodian. The custodian-to-communication-endpoint binding provides information regarding the communication endpoints located on the custodian. The communication-endpoint-to-physical-address binding binds a particular communication endpoint with its current physical address, thus allowing the remotely coupled device to determine how to reach the communication endpoint via different network infrastructures, such as a session initiation protocol (SIP) session or the domain name system (DNS).

When a client device generates a CCN interest for certain content, a local custodian routing process running on the client device performs a content-prefix-to-custodian lookup based on the prefix of the desired content in order to identify a custodian for the content. In one embodiment, a longest-prefix matching is performed. Based on the identified custodian, a custodian-to-communication-endpoint lookup is also performed to identify a communication endpoint for the identified custodian. Subsequently, the client device establishes a communication channel, such as a point-to-point tunnel negotiated via SIP, with the communication endpoint and obtains the desired content.

Figure 2:
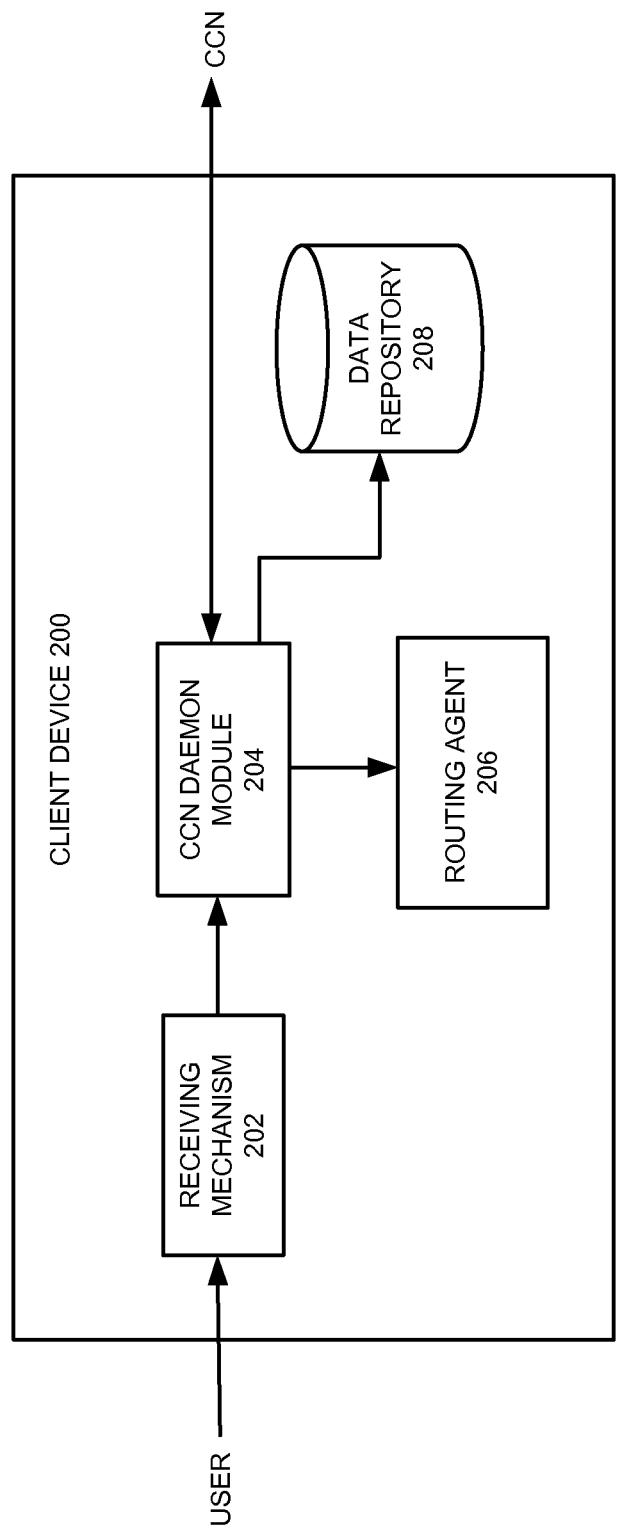
FIG. 2 presents a diagram illustrating the architecture of an exemplary client device in accordance with an embodiment of the present invention.

FIG. 2 presents a diagram illustrating the architecture of an exemplary client device in accordance with an embodiment of the present invention. Client device 200 includes receiving mechanism 202, a CCN daemon module 204, a routing agent 206, and a data repository 208.

During operation, receiving mechanism 202 receives a request from the user for certain content. In one embodiment, such a request is in the form of a CCN interest. Receiving mechanism 202 passes the received request to CCN daemon module 204 which is configured to run a background process for the CCN. CCN daemon module 204 is configured to contact routing agent 206 to obtain routing information to the custodian storing the requested content. Such routing information is stored in data repository 208, which can be updated via the CCN or other networks.

To ensure that all devices within a CCN have up-to-date routing information, when a device communicates with another device, the devices can exchange their stored routing information, including content-prefix-to-custodian mapping and custodian-to-endpoint mapping information. For example, as soon as a new device joins the network, it exchanges its content-prefix-to-custodian mapping table and custodian-to-endpoint mapping table with other devices in the network. Such exchanges occur during the initial contact between devices. As a result, the routing information can be distributed to all devices within the CCN. In one embodiment, the exchange of the routing information is secured using the authentication feature that is inherent to CCN. When exchanging routing information, a device should use standard practices for ordered messages and only accept a message if its version is newer than what is already known. In one embodiment, a device may use the "get the latest version" feature of an interest.

Note that by using the aforementioned three types of mapping (the content-prefix-to-custodian mapping, the custodian-to-communication-endpoint mapping, and the communication-endpoint-to-physical-address mapping) the system effectively decouples them from each other. In other words, the content-prefix-to-custodian mapping and the custodian-to-communication-endpoint mapping, both of which are unlikely to change frequently, are now decoupled from the communication-endpoint-to-physical-address mapping, which is likely to change more frequently due to the mobility of the device or dynamically assigned IP address. As a result, the system only needs to update the communication-endpoint-to-physical-address mapping. Compared with hundreds or even thousands of possible entries for the content-prefix-to-custodian mapping, the number of entries for communication-endpoint-to-physical-address mapping is much more limited. Therefore, the need for routing updates is significantly reduced as the result of the decoupling.

Figures 3A, 3B:
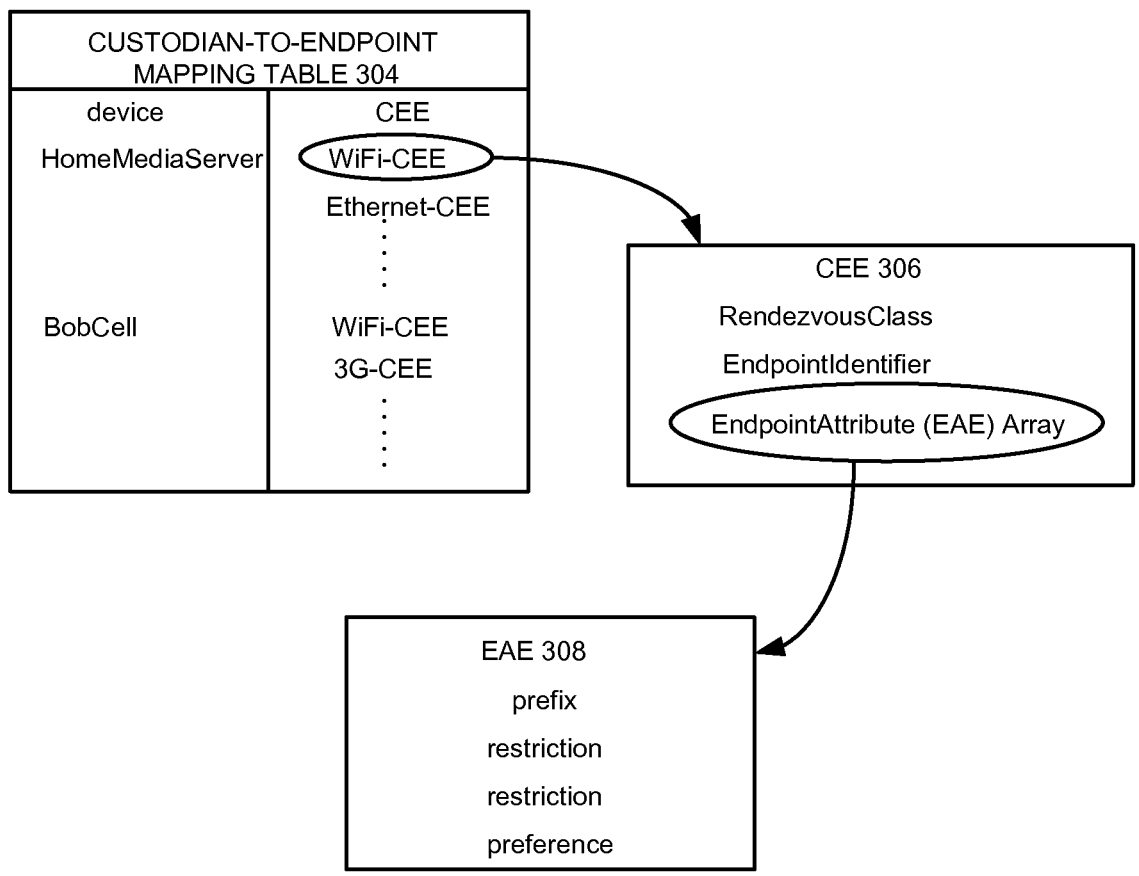
FIG. 3A presents a diagram illustrating an exemplary content-prefix-to-custodian mapping table in accordance with an embodiment of the present invention.
FIG. 3B presents a diagram illustrating an exemplary custodian-to-endpoint mapping table in accordance with an embodiment of the present invention.

FIG. 3A presents a diagram illustrating an exemplary content-prefix-to-custodian mapping table in accordance with an embodiment of the present invention. Content-prefix-to-custodian mapping table 302 includes a number of prefix-to-custodian entries (PCEs), each having three components: the prefix, the device, and the preference. The prefix component states the content name prefix. The device component states the name of the device that covers the content name space (the custodian of the content name prefix). The preference component is an integer indicating the preference order of the given custodian. Note that only authorized custodians (devices authorized to join the CCN) can generate and exchange PCEs. A device receiving a PCE should verify its trust based on the signer and discard untrusted PCEs. In addition, a custodian can only generate PCEs for itself; that is, the "device" of the PCE must be the custodian's own device. Such limitations prevent the propagation of bogus PCEs within the CCN. For given content, the custodian with the highest preference number is contacted first by the requesting device.

The preference of a custodian specifies the order in which it should be contacted, with higher preferences being tried first. In the case where two custodians have the same preference, the device may choose between them via standard network practices, such as closest (e.g., latency), least expensive (e.g., WiFi™ instead of cellular), random, or in parallel. Once one (or more) custodian of a given preference is chosen, the requesting device looks at the custodian-to-endpoint table to choose which network endpoint it will contact. If all usable network endpoints fail to connect, the requesting device can choose a next custodian to contact, and repeats the process until a connection is established successfully. When a device fails to connect to a network endpoint, the device can remember the failure and use standard network practices to avoid repeatedly trying to connect to the failed endpoint. In one embodiment, the device can keep a hold-down timer for the endpoint and not re-try the endpoint until the timer expires. If all usable endpoints for a custodian are in such a failure mode, the custodian is determined unreachable and would be skipped in future lookups until at least one endpoint becomes usable.

FIG. 3B presents a diagram illustrating an exemplary custodian-to-endpoint mapping table in accordance with an embodiment of the present invention. Custodian-to-endpoint mapping table 304 provides a mapping between a custodian and the endpoints (or routes) that enable potential paths to the given custodian. In custodian-to-endpoint mapping table 304 each custodian has one entry listing all endpoints the custodian has. Each entry includes two components: the name of the device and an array of Custodian Endpoint Entries (CEE) corresponding to all the endpoints belonging to the device. For example, a device named HomeMediaServer has a number of endpoints, including a WiFi™ interface, an Ethernet interface, etc. Consequently, the corresponding CEE array includes a WiFi™ CEE, an Ethernet CEE, etc. A given physical interface, such as the Ethernet interface, may have different parameters, such as one being a direct DNS-resolved TCP connection and the other being a SIP-negotiated user datagram protocol (UDP) tunnel.

A CEE 306 includes three components: a Rendezvous-Class component, an EndpointIdentifier component, and an EndpointAttribute (EAE) component. The RendezvousClass component specifies which rendezvous class this particular endpoint requires. The RendezvousClass describes how devices discover each other. The EndpointIdentifier component is specific to the RendezvousClass and provides data needed for implementing the rendezvous method. In one embodiment, the EndpointIdentifier provides the physical address to endpoint mapping information, which enables a remote client device to establish a connection to the endpoint. For example, if the rendezvous class specifies SIP, then the EndpointIdentifier can contain the SIP address, which is typically in a "user@hostname" format, and the "hostname" would be contacted. If the RendezvousClass specifies WiFi™, then the EndpointIdentifier can contain the service set identifier (SSID) of the wireless local area network (LAN), the basic service set identifier (BSSID), and the media access control (MAC) address of the access point (AP). A DNS/TCP class, for example, would specify a DNS hostname and a TCP port. Hence, to contact that endpoint, a device can perform a DNS query for the hostname and establish a direct TCP connection to the specified port. In a further embodiment, instead of storing the endpoint-to-physical-address mapping as EndpointIdentifier in CEE 306, such mapping information is stored at and can be obtained from a third-party service. For example, a public SIP server can be used to provide the rendezvous service, or the DNS can be used to resolve a hostname.

In one embodiment, the system can include timers or other state for a CEE that is not part of custodian routing. These timers or state can be used to handle error conditions, such a failure to connect, poor quality endpoints, or other transient conditions.

The EAE component can be an array with each element associated with a content prefix. EAE 308 can include multiple components, including a content prefix, one or more restriction components, and a preference. The content prefix specifies the CCN name space this EAE is associated with, or a wildcard meaning all prefixes advertised by the custodian in the content-prefix-to-custodian mapping. A restriction component specifies optional conditions a device must satisfy to use the endpoint. An exemplary restriction component is an accessCheck component that specifies some criteria about a device's cryptographic identity, such as it being issued by a trusted source. Other restrictions are those typically found in stateful firewall rules (e.g. tunnel encryption method, time of day). For example, a cell phone may only allow a home media server to obtain content from it in order to preserve battery life. If the restriction components are left unspecified, then any user or any device can use the endpoint for the specified content prefix. The preference component specifies the order of preference this endpoint has relative to other endpoints belonging to the same custodian. For example, a user's phone may have three endpoints: the WiFi™ interface, the 3G cellular interface, and the Bluetooth interface, and, among them, the user would prefer the WiFi™ interface to be the first endpoint contacted by other devices requesting for content.

The "prefix" component of an EAE can limit the usability of a CEE to a subset of all the prefixes advertised by the custodian in the content-prefix-to-custodian mapping table. The prefix should be matched according to longest matching prefix rules. That is, an EAE for "/abc/def" would match "/abc/def/ghi" and be evaluated before an EAE for "/abc." If a remote device failed the "/abc/def" restrictions, it would try matching itself to the "/abc" rule. For a given prefix, the restrictions and EAE preference apply. Considering the example shown in FIG. 3A where HomeMediaServer advertises two prefixes: "/Bob home/photos" and "/Bob home/ videos". As an example, the HomeMediaServer may want to serve videos over the Ethernet interface with higher preference than photos, and serve everything else over either interface with equal preference. In that case, the Ethernet-CEE would have a "/Bob home/videos" EAE with a higher preference, such as 10, and a wildcard EAE with a lower preference, such as 5. The WiFi™ CEE would have a wildcard EAE with preference 5 too.

The restriction components of an EAE can also specify certain checks that a remote endpoint must pass before using the CEE. If a remote device fails to match any EAE, then the whole CEE is unusable by the remote device and it should not attempt to connect to it. The restrictions can be simple conditions or complex Boolean statements, but in any case, the restrictions need to be evaluated as "true" to allow a remote endpoint to use the CEE. For example, a restriction may indicate that the device's identity be verified by a trusted signer, such as being a device that is part of a household's set of devices. In addition, to setup a hub-spoke style distribution system, a cell phone's CEEs may only allow the home's media server to connect, while the media server's CEEs may allow anyone in the household to connect.

The preference component of an EAE can be a number that determines in which order CEEs are tried. CEEs with the highest preference are tried first, and CEEs with equal preference may be tried in an order determined by the calling device, using standard networking practices, such as closest (minimum latency), least expensive, random, or in parallel. If a remote device matches a set of multiple EAEs for a CEE, due to satisfying multiple restrictions for the prefix, it should use the preference of the longest matching EAE, or if there are multiple longest matching EAEs, it should use the one with the highest preference.

Each entry in custodian-to-endpoint mapping table 304 is also called a custodianEndpointDescriptor (CED), which is a versioned CCN object. A new version of the CED replaces all previous versions. When a new CED is learnt by a device, the routing agent of the device modifies its connections according to the new entry and applies the policies specified by the new CED.

Note that content-prefix-to-custodian mapping table 302 and custodian-to-endpoint mapping table 304 are maintained by each device coupled to the CCN, and each time the device communicates with another device coupled to the CCN, it can exchange content-prefix-to-custodian mapping table 302 and custodian-to-endpoint mapping table 304 with the other device. As a result, all devices in the CCN can have up-to-date copies of content-prefix-to-custodian mapping table 302 and custodian-to-endpoint mapping table 304.

Figure 4A:
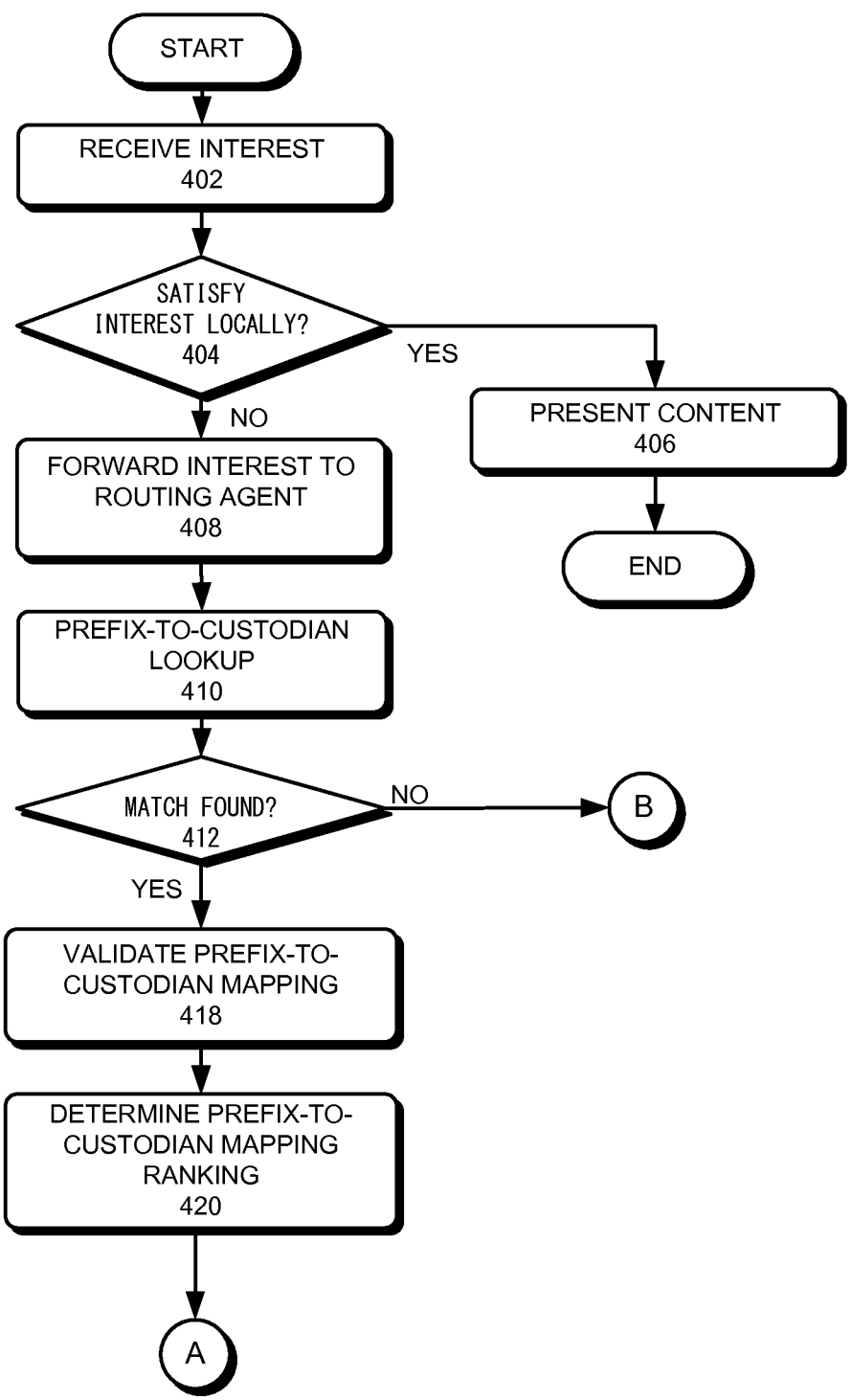
FIG. 4A and FIG. 4B present a flowchart illustrating an exemplary process of obtaining content from a custodian in accordance with an embodiment of the present invention.
Figure 4B:
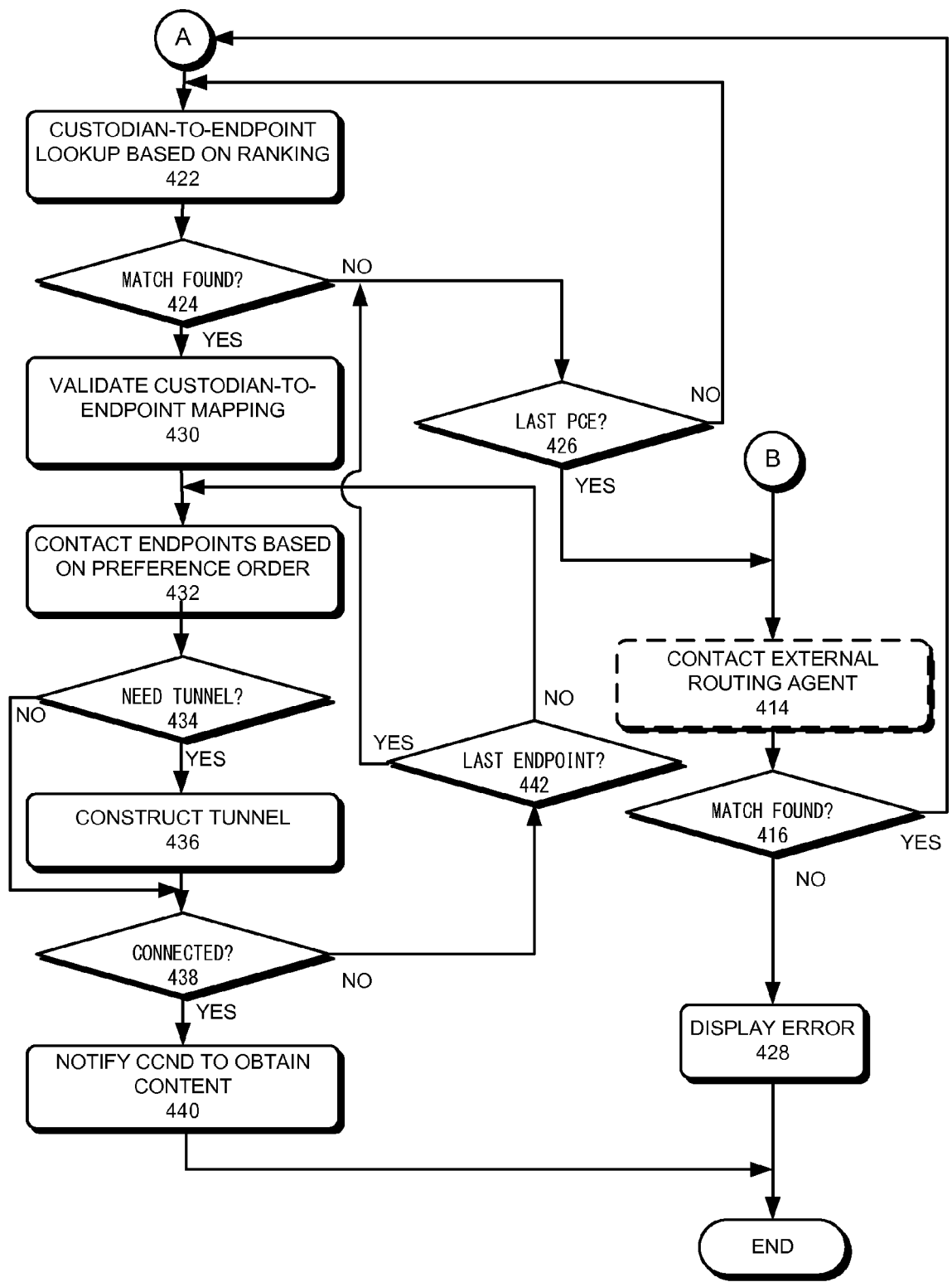

FIG. 4A and FIG. 4B present a flowchart illustrating an exemplary process of obtaining content from a custodian in accordance with an embodiment of the present invention. During operation, a CCN process, such as a CCN daemon (CCND), running on a client device receives a request from a user for certain content (operation 402). In one embodiment, the request is in the format of a CCN interest specifying the CCN name of the requested content. The CCND determines whether the request can be satisfied locally (operation 404), that is whether the device itself stores the requested content. If so, the device presents the content (operation 406). If not, the CCND forwards the request to the routing agent (operation 408), which in turn performs a content-prefix-to-custodian lookup (operation 410). In one embodiment, the content-prefix-to-custodian mapping information is stored as a CCN content object, and the routing agent can obtain this mapping information by expressing an interest in this content, which may be stored locally or flooded to other connected devices. For example, the content-prefix-to-custodian mapping table of a family can have a CCN prefix of /custrouting/home/P-C/. By broadcasting this interest over the CCN, the client device is guaranteed to obtain a matching result as long as the content is stored somewhere in the CCN. In a further embodiment, the system performs the longest prefix-matching in order to provide proper content-prefix-to-custodian mapping. The system then determines whether a match is found (operation 412). If no match is found, optionally, the CCND contacts a possible external routing agent (operation 414), and determines whether the external routing agent can provide a match (operation 416). If the external agent cannot find a match, CCND displays an error message indicating the request content is inaccessible (operation 428).

If a content-prefix-to-custodian lookup finds at least one match, either by the internal or external routing agent, the system validates the content-prefix-to-custodian mapping entry (operation 418). In one embodiment, to perform the validation, the system determines whether the custodian is an authorized device in the CNN and whether the content-prefix-to-custodian mapping entry is a valid entry (i.e., the creator of the entry is the custodian itself).

Subsequently, the system determines the ranking among all found content-prefix-to-custodian mapping entries (operation 420). It begins with the set of longest matching prefixes, followed by shorter matching prefixes in a strict order of the prefix match length. In one embodiment, such a determination between custodians of equal prefix match length is based on the preference number included in the PCE, and the custodian with the highest preference number will be contacted by the client device first. In one embodiment, the client device simultaneously contacts multiple custodians having the same preference level. Based on the ranking order, the system performs a custodian-to-endpoint lookup for identified custodians based on current connection conditions (operation 422), and determines whether a match (an allowed endpoint) has been found (operation 424). In one embodiment, the custodian-to-endpoint mapping information is stored in the data repository of the client device. In a further embodiment, the custodian-to-endpoint mapping information is stored as a CCN content object, and the client device can obtain this mapping information by expressing an interest in this content. For example, the custodian-to-endpoint mapping table of a family can have a CCN prefix of /custrting/home/C-E/. Note that the mapping is determined by the content prefix, the requesting client device, and the condition of the custodian. For example, due to limited bandwidth, a cell phone may prohibit a remote device from obtaining photo content via its cellular (such as 3G) interface.

If no usable custodian-to-endpoint mapping entry is found, the system determines whether the current PCE is the last PCE, that is, whether the current PCE is the one with the lowest preference number and the shortest prefix match length (operation 426). If not, the system moves on to the next PCE by performing the custodian-to-endpoint lookup for the corresponding custodian (operation 422). If the current PCE is the last PCE, optionally, the CCND contacts a possible external routing agent (operation 414), and determines whether the external routing agent can provide a match (operation 416). If the external agent cannot find a match, CCND displays an error message indicating the request content is inaccessible (operation 428).

If the custodian-to-endpoint lookup returns matches, the system then validates such entries (operation 430). In one embodiment, the system validates the custodian-to-endpoint mapping by determining whether the creator of such mapping is the custodian itself. Subsequently, the client device contacts the mapped endpoints based on their ranking order (operation 432). Note that the connection information for a particular endpoint is maintained in the CEE associated with the endpoint. For example, the connection information to a media server may include the MAC address of the access point, the SSID, and/or the IP address. The system then determines whether a tunnel is needed to establish a connection with the endpoint (operation 434). In one embodiment, the client device can simultaneously contact multiple endpoints having the same preference number. If a tunnel is needed, an appropriate tunnel, such as a SIP tunnel, will be constructed to facilitate the establishment of the communication channel (operation 436).

The client device then determines whether a connection has been established (operation 438). If so, the CCND is notified in order to obtain the requested content via the established communication channel (operation 440). If the connection fails, the system determines whether the endpoint is the last allowed endpoint based on the custodian-to-endpoint mapping (operation 442). If not, the client device will contact the next allowed endpoint (operation 432). If the endpoint is the last allowed endpoint, the client device further determines whether the current PCE is the last PCE (the PCE with the lowest preference number) (operation 426). If so, optionally, the CCND contacts a possible external routing agent (operation 414), and determines whether the external routing agent can provide a match (operation 416). If the external agent cannot find a match, CCND displays an error message indicating the request content is inaccessible (operation 428).

Computer and Communication System

Figure 5:
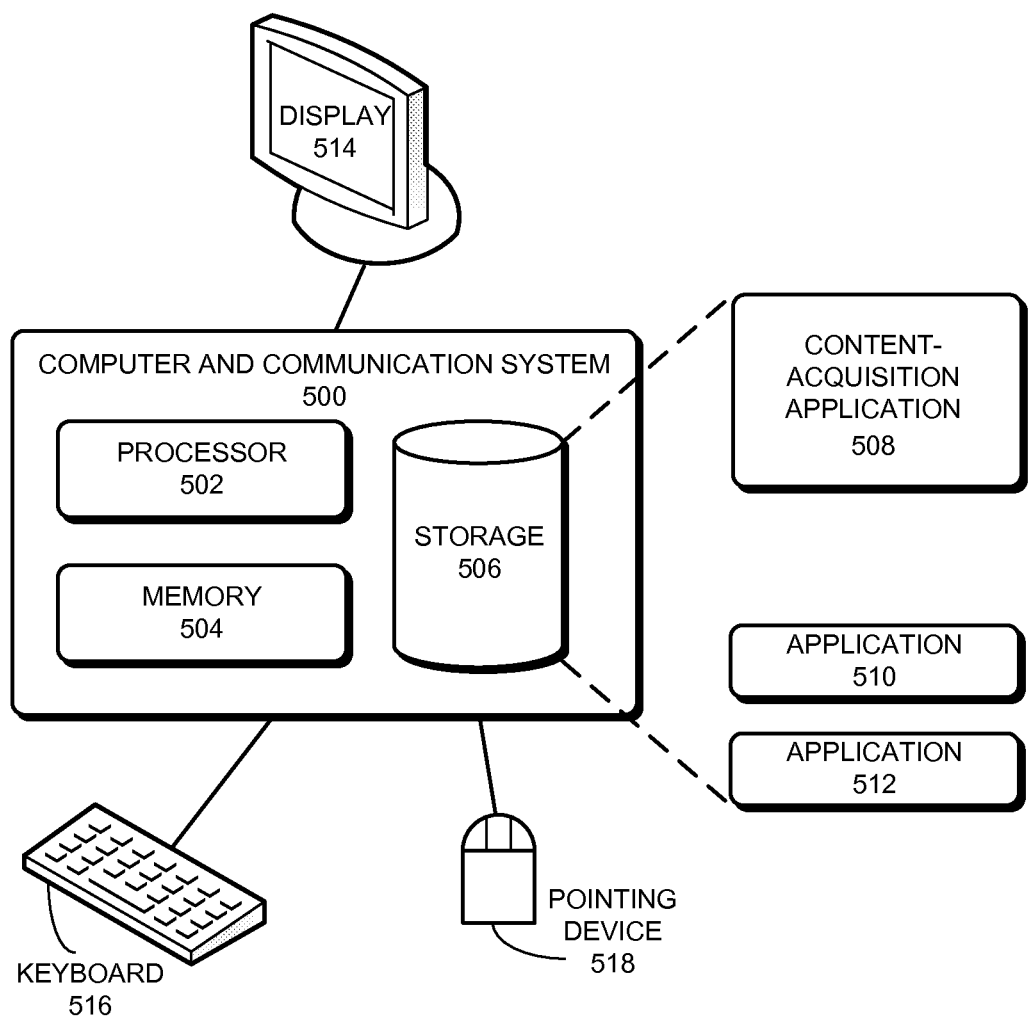
FIG. 5 presents an exemplary computer system for facilitating custodian-based routing over a CCN in accordance with an embodiment of the present invention.

FIG. 5 presents an exemplary computer system for facilitating custodian-based routing over a CCN in accordance with an embodiment of the present invention. In FIG. 5, a computer and communication system 500 includes a processor 502, a memory 504, and a storage device 506. Storage device 506 stores programs to be executed by processor 502. Specifically, storage device 506 stores a content-acquisition application 508, as well as other applications, such as applications 510 and 512. During operation, content-acquisition application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
   receiving, by a computing device, a request for a piece of content that indicates the content by name;
   determining whether the content is available locally;
   in response to the content not being available locally, determining a custodian identifier of a remote custodian device that stores the content, wherein determining the custodian identifier involves determining a preference level of the remote custodian device, and performing a content-prefix-to-custodian lookup to obtain a mapping from a prefix of the content's name to the custodian identifier, and wherein the custodian identifier does not indicate a network address for the remote custodian device;
   identifying a communication endpoint, which corresponds to the custodian identifier of the remote custodian device, through which the computing device is to obtain the content, wherein the communication endpoint indicates one of a plurality of communication interfaces associated with the remote custodian device;

verifying that the computing device satisfies one or more conditions for accessing a namespace specified by the content name's prefix, wherein the namespace is associated with the remote custodian device's communication endpoint;

determining a network address mapped to the identified communication endpoint of the remote custodian device; and establishing a connection to the communication endpoint using the mapped network address to obtain the requested content.

2. The method of claim 1, wherein the computing device and the remote custodian device are coupled via a content-centric network (CCN).

3. The method of claim 2, wherein determining the custodian identifier of the remote custodian device that stores the content involves performing a lookup based on the content's name.

4. The method of claim 3, further comprising constructing a CCN interest for mapping information associated with the content's name.

5. The method of claim 1, wherein identifying the communication endpoint involves performing a lookup based on the remote custodian device's name.

6. The method of claim 1, wherein identifying the communication endpoint involves determining a preference level of the communication endpoint.

7. The method of claim 1, wherein the communication endpoint is a wireless interface, and wherein the network address includes at least one of:
a service set identifier (SSID);
a media access control (MAC) address of an access point associated with the wireless interface; and
an Internet protocol (IP) address.

8. The method of claim 1, wherein the connection to the communication endpoint includes a session initiation protocol (SIP) connection.

9. A non-transitory computer-readable storage medium storing instructions that when executed by a computer cause the computer to perform a method, the method comprising:
receiving, by a computing device, a request for a piece of content that indicates the content by name;
determining whether the content is available locally;
in response to the content not being available locally, determining a custodian identifier of a remote custodian device that stores the content, wherein determining the custodian identifier involves determining a preference level of the remote custodian device, and performing a content-prefix-to-custodian lookup to obtain a mapping from a prefix of the content's name to the custodian identifier, and wherein the custodian identifier does not indicate a network address for the remote custodian device;
identifying a communication endpoint, which corresponds to the custodian identifier of the remote custodian device, through which the computing device is to obtain the content, wherein the communication endpoint indicates one of a plurality of communication interfaces associated with the remote custodian device;
verifying that the computing device satisfies one or more conditions for accessing a namespace specified by the content name's prefix, wherein the namespace is associated with the remote custodian device's communication endpoint;
determining a network address mapped to the identified communication endpoint of the remote custodian device; and
establishing a connection to the communication endpoint using the mapped network address to obtain the requested content.

10. The computer-readable storage medium of claim 9, wherein the computing device and the remote custodian device are coupled via a content-centric network (CCN).

11. The computer-readable storage medium of claim 10, wherein determining the custodian identifier of the remote custodian device that stores the content involves performing a lookup based on the content's name.

12. The computer-readable storage medium of claim 11, wherein the method further comprises constructing a CCN interest for mapping information associated with the content's name.

13. The computer-readable storage medium of claim 9, wherein identifying the communication endpoint involves performing a lookup based on the remote custodian device's name.

14. The computer-readable storage medium of claim 9, wherein identifying the communication endpoint involves determining a preference level of the communication endpoint.

15. The computer-readable storage medium of claim 9, wherein the communication endpoint is a wireless interface, and wherein the network address includes at least one of:
a service set identifier (SSID);
a media access control (MAC) address of an access point associated with the wireless interface; and
an Internet protocol (IP) address.

16. The computer-readable storage medium of claim 9, wherein the connection to the communication endpoint includes a session initiation protocol (SIP) connection.

17. A computing device, comprising:
a receiving mechanism configured to receive a request for a piece of content that indicates the content by name;
a determining mechanism configured to determine whether the content is available locally;
a routing agent, in response to the content not being available locally, configured to:
determine a custodian identifier of a remote custodian device that stores the content, wherein determining the custodian identifier involves determining a preference level of the remote custodian device, and performing a content-prefix-to-custodian lookup to obtain a mapping from a prefix of the content's name to the custodian identifier, and wherein the custodian identifier does not indicate a network address for the remote custodian device;
identify a communication endpoint, which corresponds to the custodian identifier of the remote custodian device, through which the computing device is to obtain the content, wherein the communication endpoint indicates one of a plurality of communication interfaces associated with the remote custodian device;
verify that the computing device satisfies one or more conditions for accessing a namespace specified by the content name's prefix, wherein the namespace is associated with the remote custodian device's communication endpoint; and
determining a network address mapped to the identified communication endpoint of the remote custodian device; and a connection mechanism configured to establish a connection to the communication endpoint using the mapped network address to obtain the requested content.

18. The computing device of claim 17, wherein the computing device is coupled to the remote custodian device via a content-centric network (CCN).

19. The computing device of claim 18, wherein determining the custodian identifier of the remote custodian device that stores the content involves performing a lookup based on the content's name.

20. The computing device of claim 19, further comprising an interest construction mechanism configured to construct a CCN interest for mapping information associated with the content's name.

21. The computing device of claim 17, wherein identifying the communication endpoint involves performing a lookup based on the remote custodian device's name.

22. The computing device of claim 17, wherein the communication endpoint is a wireless interface, and wherein the network address includes at least one of:
   a service set identifier (SSID);
   a media access control (MAC) address of an access point associated with the wireless interface; and
   an Internet protocol (IP) address.

23. The computing device of claim 17, wherein the connection to the communication endpoint includes a session initiation protocol (SIP) connection.

* * * * *